United States Patent
Mori (10) Patent No.: US 9,137,062 B2
(45) Date of Patent: Sep. 15, 2015

(54) WIRELESS COMMUNICATION APPARATUS AND WIRELESS COMMUNICATION METHOD

(71) Applicant: KABUSHIKI KAISHA TOSHIBA, Toyko (JP)

(72) Inventor: Shuzo Mori, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/191,261

(22) Filed: Feb. 26, 2014

(65) Prior Publication Data
US 2015/0063515 A1    Mar. 5, 2015

(30) Foreign Application Priority Data
Sep. 4, 2013  (JP) ................................. 2013-183071

(51) Int. Cl.
*H03D 3/22* (2006.01)
*H04L 25/49* (2006.01)
*H04L 27/233* (2006.01)

(52) U.S. Cl.
CPC ........ *H04L 25/4904* (2013.01); *H04L 27/2338* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS 5,504,454 A * 4/1996 Daggett et al. ................ 329/304

FOREIGN PATENT DOCUMENTS

JP     2008-205863 A    9/2008

* cited by examiner

*Primary Examiner* — Adolf Dsouza
(74) *Attorney, Agent, or Firm* — Patterson & Sheridan, LLP (57) ABSTRACT

A wireless communication apparatus receives a wireless signal whose phases represent data values and determines the data values represented in the phases of the wireless signal. The apparatus includes a counter that updates a count value at a frequency higher than a frequency of the wireless signal, and resets the count value to an initial value when the phase of the wireless signal changes or when the counter overflows, a capture timing setting unit that sets a phase capture value in response to a resetting of the count value, and a phase capturing unit that captures the phase of the wireless signal when the count value reaches the phase capture value.

20 Claims, 6 Drawing Sheets

FIG. 7

WIRELESS COMMUNICATION APPARATUS AND WIRELESS COMMUNICATION METHOD

CROSS-REFERENCE TO RELATED APPLICATION

This application is based upon and claims the benefit of priority from Japanese Patent Application No. 2013-183071, filed Sep. 4, 2013, the entire contents of which are incorporated herein by reference.

FIELD

Embodiments described herein relate generally to a wireless communication apparatus and a wireless communication method.

BACKGROUND

In Binary Phase Shift Keying (BPSK) schemes or On/Off Keying (OOK) schemes which are used in wireless IC cards or the like, received data values are determined in response to phases of waveforms of wireless signals. Therefore, even when the wireless signals are distorted to some extent, it is necessary to capture the phases accurately.

DETAILED DESCRIPTION

Embodiments provide a wireless communication apparatus and a wireless communication method capable of capturing a phase of a wireless signal accurately.

In general, according to one embodiment, a wireless communication apparatus receives a wireless signal whose phases represent data values and determines the data values represented in the phases of the wireless signal. The apparatus includes a counter that updates a count value at a frequency higher than a frequency of the wireless signal, and resets the count value to an initial value when the phase of the wireless signal changes or when the counter overflows, a capture timing setting unit that sets a phase capture value in response to a resetting of the count value, and a phase capturing unit that captures the phase of the wireless signal when the count value reaches the phase capture value.

Hereinafter, embodiments will be specifically described with reference to drawings.

Figure 1:
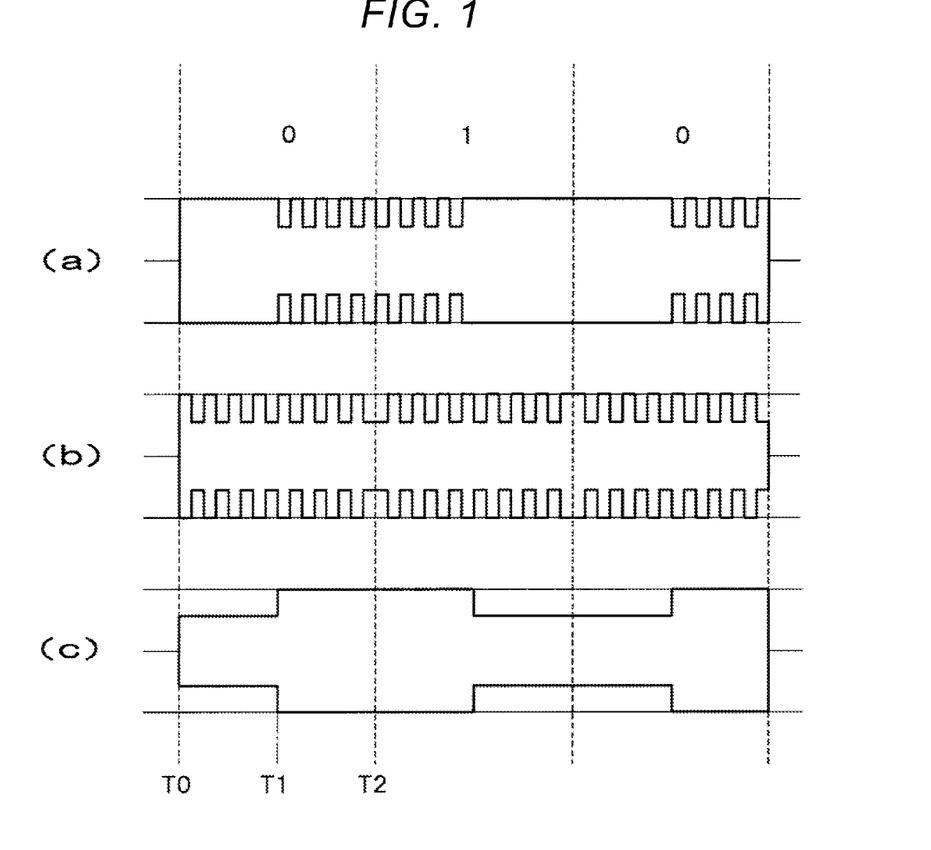
FIG. 1 is a diagram schematically depicting received wireless signals in the present embodiment.

FIG. 1 is a diagram schematically depicting received wireless signals in the present embodiment. In FIG. 1, the envelopes of the wireless signals are drawn. In the present embodiment, a wireless signal, in which one data value contains both a modulated waveform and a non-modulated waveform, is regarded as an object. Further, the phase of the wireless signal represents a data value, and the phase of the wireless signal is intended to be captured in order to acquire the data value.

The specific examples of the wireless signal as an object includes a wireless signal whose modulation scheme is On-Off-keying (OOK) and coding scheme is Manchester encoding ((a) of FIG. 1), a wireless signal whose modulation scheme is Binary-Phase Shift Keying (BPSK) and coding scheme is Non-Return to Zero L (NRZ-L) ((b) of FIG. 1), and a wireless signal whose modulation scheme is Amplitude Shift Keying (ASK) and coding scheme is Manchester encoding ((c) of FIG. 1).

Hereinafter, the present embodiment is described by taking the wireless signal shown in (c) of FIG. 1 as an example. In (c) of FIG. 1, time intervals T0 to T1, T1 to T2, or the like, are one period of the wireless signal. One period of the wireless signal is shown as a bit such as "0" or "1". For example, one period of time intervals T0 to T1 is indicated by "0", and one period of time intervals T1 to T2 is indicated by "1".

In the wireless signal, two successive bits correspond to one data value. Specifically, two bits "10", which represent a transition from "1" to "0" of the phase of the wireless signal, correspond to a value 1, whereas two bits "01", which represent a transition from "0" to "1", correspond to a value 0. Accordingly, the phase corresponding to two successive periods in the wireless signal is captured as one data value. The two bits "10" or "01" are referred to as 1 Elementary Time Unit (etu). Hereinafter, a description is given based on a period.

Here, since the value 1 and the value 0 correspond to "10" and "01" respectively, three or more successive "0"s and three or more successive "1"s are not possible in Manchester encoding. In other words, the phase "0" is successive only in two periods at maximum, and the phase "1" is successive only in two periods at maximum.

Figure 2:
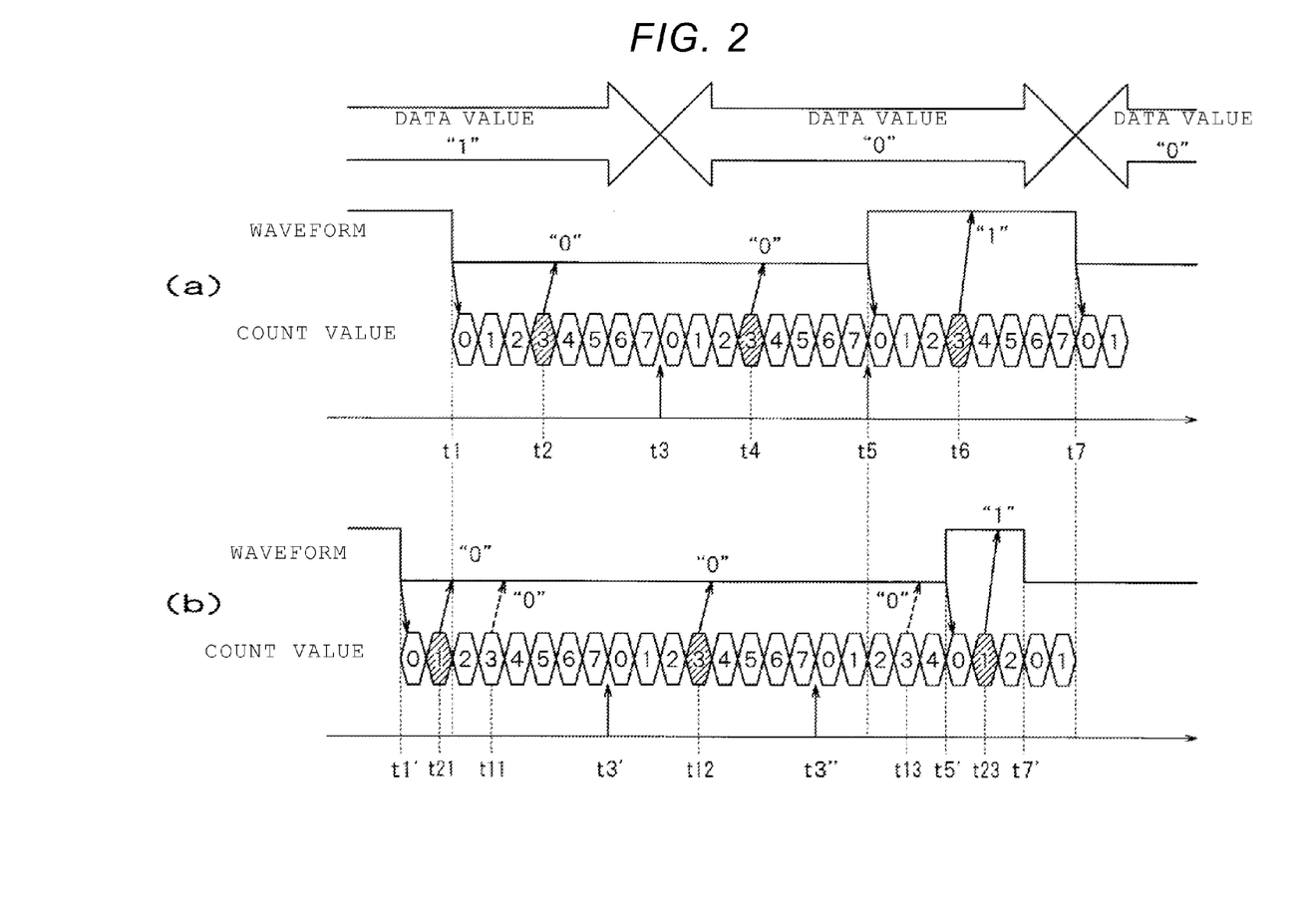
FIG. 2 is a diagram explaining a phase capturing method of the wireless signals in the present embodiment.

FIG. 2 is a diagram explaining a phase capturing method of the wireless signals in the present embodiment. In the present embodiment, a counter operating with a frequency higher than the frequency of the wireless signal is used. Therefore, in FIG. 2, the waveforms of the wireless signals (the waveforms of the digital signals obtained by demodulating the wireless signals is shown) and count values by the counter are schematically drawn. The count values are reset in predetermined timings (described later) to 0, and thereafter, are counted up to a maximum value. Then, when the count value reaches a specific value (hereinafter, referred to as a phase capture value), the phase of the wireless signal is captured.

In the examples of FIG. 2, the count values are updated eight times in one period of the wireless signal. In other words, the frequency of the counter is eight times the frequency of the wireless signal and the maximum value of the count value is set to 7. Thus, in this case, the count values are counted up from an initial value 0 to the maximum value 7 in one period of the wireless signal.

Waveforms in (a) of FIG. 2 depict an ideal state, i.e., one in which the wireless signal is not distorted. Respective time intervals t1 to t3, t3 to t5, and t5 to t7 are each one period of the wireless signal. In this case, in the phase of the wireless signal, the time interval of "1" and a time interval of "0" are equal, and the duty ratio is 50% for each data value.

At times t1 and t5, the count value is reset to the initial value 0 in synchronism with the edge of the wireless signal (that is, the switching of phase). Hereinafter, such a reset is referred to as a reset by edge.

Further, at time t3, if the count value reaches the maximum value 7, the counter overflows and is reset to the initial value 0. Hereinafter, such a reset is referred to as a reset by overflow.

In addition, when the frequency of the counter is eight times the frequency of the wireless signal and the maximum value of the count value is 7, if the wireless signal is not distorted, only when the count value is the maximum value 7, does the reset by edge occur.

Then, the phase of the wireless signal is captured with the phase capture value. The phase capture value of 3 is used as a reference value, because 3 is an intermediate value between the initial value and the maximum value of the count value. As the result, the phase of the wireless signal is captured at times t2, t4, and t6 shown in FIG. 2(a), and the values captured at times t2, t4, and t6 are respectively "0", "0", and "1". In this manner, if the wireless signal is not distorted, the phase of the wireless signal is captured reliably once in each period.

However, the wireless signal is often distorted and thus the period may change.

Waveforms in (b) of FIG. 2 depict a state in which the wireless signal of (a) of FIG. 2 is distorted, and more specifically, the period in which the phase of the wireless signal is "0" is longer. In other words, the phase of the wireless signal is "0" at time t1' earlier than time t1, "1" at time t5' later than time t5, and "0" at time t7' earlier than time t7 compared to (a) of FIG. 2. In this case, the wireless signal is distorted, and thus the duty ratio of data value "1" is smaller than 50% and the duty ratio of data value "0" is larger than 50%.

Similar to (a) of FIG. 2, if the phase of the wireless signal is captured by taking the phase capture value as 3, the phases at times t11, t12, and t13 are captured, and the captured values are "0", "0" and "0", respectively. Because the captured value "0" at time t13 is different from the captured value "1" at time t6 in (a) of FIG. 2, it is an erroneous value. The error is caused by the phase being captured three times during time interval t1' to t5' corresponding to two periods in which the value is a "0", but the phase not being captured even once during time interval t5' to t7' corresponding to the period in which the value is a "1".

Therefore, in the present embodiment, the phase capture value is set in response to the reset timing of the count value as described below.

First, if the reset by edge occurs (at times t1' and t5'), the phase capture value is set to 1 earlier than the reference value 3. Thus, "0" is captured at time t21 after edge time t1'. In addition, "1" is correctly captured at time t23 after edge time t5'.

Further, after the reset by edge occurs at time t1', if the reset by overflow occurs for the first time at time t3', the phase capture value is set to the reference value 3 as usual. Thus, "0" is captured at time t12.

Thereafter, after the reset by edge occurs at time t1', if the reset by the overflow occurs twice in succession at times t3' and t3", the phase capture value is set to 6, later than the reference value 3 due to the following reason.

In Manchester encoding, as long as the waveform of the wireless signal is not distorted, "0" occurs successively at most in two periods. Accordingly, if there is no large distortion in the wireless signal, after the reset by edge, the reset by overflow should not occur twice in succession. Nevertheless, since the reset by overflow arises continuously twice, it can be predicted that the wireless signal becomes the waveform with a higher duty ratio (period) of "0" than in the non-distorted case. Therefore, the phase capture value is set to a value larger than the reference value 3 so that after a reset by overflow of the second time, the phase of the third time is not captured.

After time t3", before the count value reaches 6, the reset by edge occurs at time t5'. Therefore, the phase of the wireless signal is not captured between times t3" to t5'. As a result, the phase is captured only twice between times t1' to t5' corresponding to two periods.

In this manner, since the phase capture value is set dynamically, the phase of the wireless signal is correctly captured only once during each period of the wireless signal.

Figure 3:
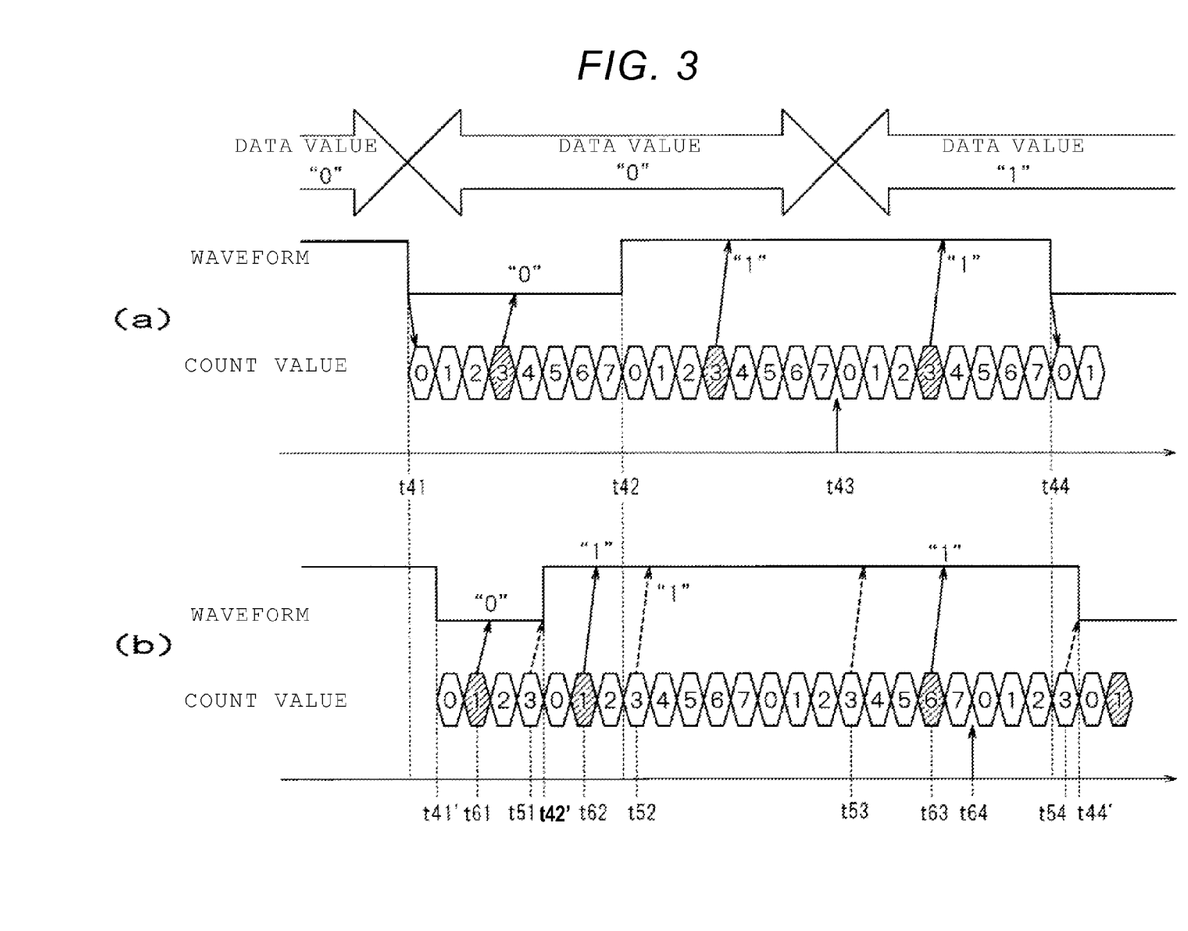
FIG. 3 is a diagram explaining a phase capturing method of the wireless signals in the present embodiment.

FIG. 3 is another diagram explaining a phase capturing method of the wireless signals in the present embodiment. Waveforms in (a) of FIG. 3 depict an ideal state, i.e., one in which the wireless signal is not distorted. Further, waveforms in (b) of FIG. 3 depict a state in which the wireless signal in (a) of FIG. 3 is distorted, and more specifically, the period in which the phase of the wireless signal is "1" is longer than in the non-distorted case.

The waveforms in (a) of FIG. 3 depict three periods of the wireless signal, the time interval from t41 to t42, the time interval from t42 to t43, and the time interval from t43 to t44, each corresponding to one period. If the phase of the wireless signal is captured by taking the phase capture value as 3, the phases are "0", "1" and "1", in the respective time intervals.

In the waveforms depicted in (b) of FIG. 3, as compared to (a) of FIG. 3, the phase of the wireless signal is "0" at time t41' later than time t41, "1" at time t42' earlier than time t42, and "0" at time t44' later than time t44. In this case, when the wireless signal is distorted, the duty ratio of "1" is larger than 50%, and the duty ratio of "0" is smaller than 50%. If the phase of the wireless signal is captured by taking the phase capture value as 3, similar to (a) of FIG. 3, the phases are captured at four times t51, t52, t53, and t54 during three periods. However, since there are phase changes at times t51 and t54, it is hard to know which value out of "0" and "1" is captured.

Therefore, in the present embodiment, the phase capture value is set in response to the reset timing of the count value as described below.

First, if the reset by edge occurs (at times t41' and t42'), as described above, the phase capture value is set to 1 earlier than the reference value 3. Thus, "0" is captured at time t61 after edge at time t41', and "1" is captured at time t62 after edge at time t42'.

Further, after the reset by edge occurs at time t41', the reset by edge occurs again at time t42'. The count value at this time does not reach 7. As described above, if the wireless signal is not distorted, the reset by edge should occur when the count value is 7.

In this manner, if the reset by edge faster than normal occurs, it is estimated that the duty ratio (period) of the present phase is reduced and the duty ratio (period) of the subsequent phase is enlarged. Accordingly, the phase capture value is set to 6 later than the reference value 3. Thus, "1" is captured correctly at time t63.

Further, after the reset by edge occurs at time t42', if the reset by overflow of the second time occurs at time t64, similar to (b) of FIG. 2, the phase capture value is set to 6 later than the reference value 3.

After time t64, before the count value reaches 6, the reset by edge occurs at time t44'. Therefore, the phase of the wireless signal is not captured between times t64 to t44'. As a result, the phase is captured only twice between times t42' to t44' corresponding to two periods.

In this manner, because the phase capture value is set dynamically, the phase of the wireless signal is correctly captured only once during each period of the wireless signal as well.

Hereinafter, a description will be given of a configuration of a wireless communication apparatus which captures the phase of the wireless signal as described above.

Figure 4:
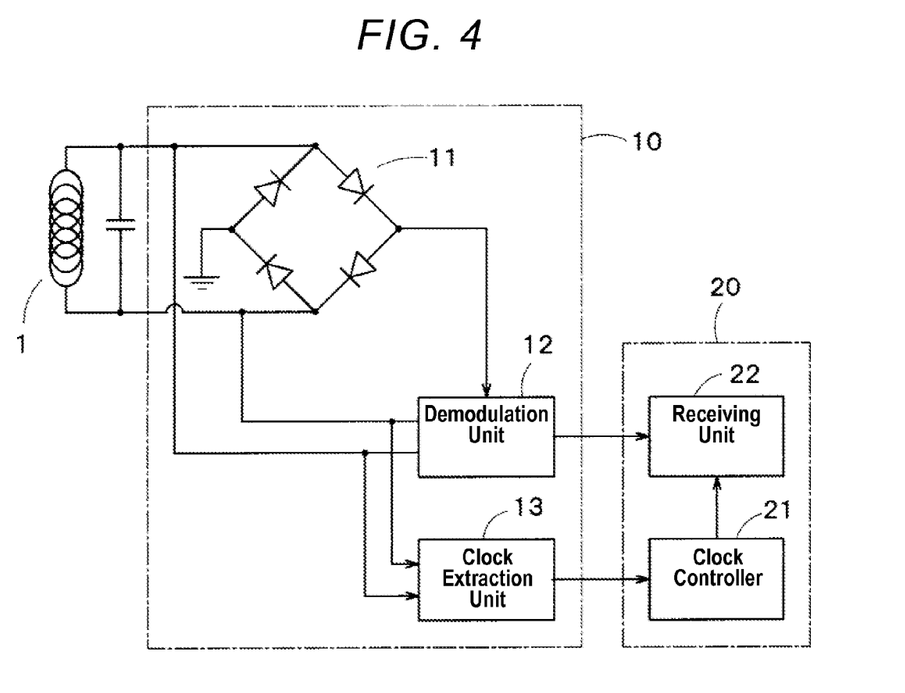
FIG. 4 is a block diagram depicting a schematic configuration of a wireless communication apparatus according to an embodiment.

FIG. 4 is a block diagram depicting a schematic configuration of the wireless communication apparatus according to an embodiment. FIG. 4 depicts the wireless communication apparatus used in a wireless IC card or the like as an example. The wireless communication apparatus wirelessly receives data and power from another wireless communication apparatus and processes the data using the received power.

The wireless communication apparatus includes a receiving coil 1, an analog circuit 10, and a logic circuit 20. Further, the analog circuit 10 includes a rectifier 11, a demodulation unit 12, and a clock extraction unit 13. The logic circuit 20 includes a clock controller 21 and a receiving unit 22.

The receiving coil 1 receives wireless signals. The rectifier 11 is formed by, for example, four diodes that are bridge-connected with each other, and thus full-wave rectifies the wireless signals. The demodulation unit 12 operates on the power that is output from the rectifier 11, and demodulates the wireless signal received in the receiving coil 1.

Figure 5:
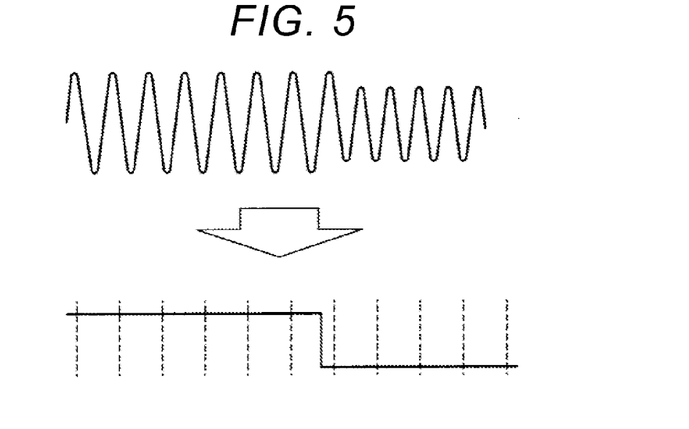
FIG. 5 is a diagram schematically depicting an operation of a demodulation unit.

FIG. 5 is a diagram schematically explaining the operation of the demodulation unit 12. FIG. 5 depicts an example of a wireless signal obtained by ASK-modulating a carrier having a frequency 13.56 MHz. The demodulation unit 12 converts the wireless signal into the digital signal having a value 0 or a value 1 according to the amplitude of the wireless signal. The frequency of the digital signal is still 13.56 MHz.

At this time, if the wireless signal is distorted, as shown in (b) of FIG. 2 or (b) of FIG. 3, the period changes, and thus the duty cycle ratios of the phases "0" and "1" are not 50%, respectively.

Returning to FIG. 4, the clock extraction unit 13 extracts a clock signal from the wireless signal received in the receiving coil 1. In the example of FIG. 5, the clock extraction unit 13 extracts a clock signal of 13.56 MHz.

The clock controller 21 of the logic circuit 20 supplies the clock signal extracted by the clock extraction unit 13 to the receiving unit 22. The receiving unit 22 captures the phase of the digital signal generated by the demodulation unit 12, by using a method described in FIGS. 2 and 3 to acquire a data value.

Figure 6:
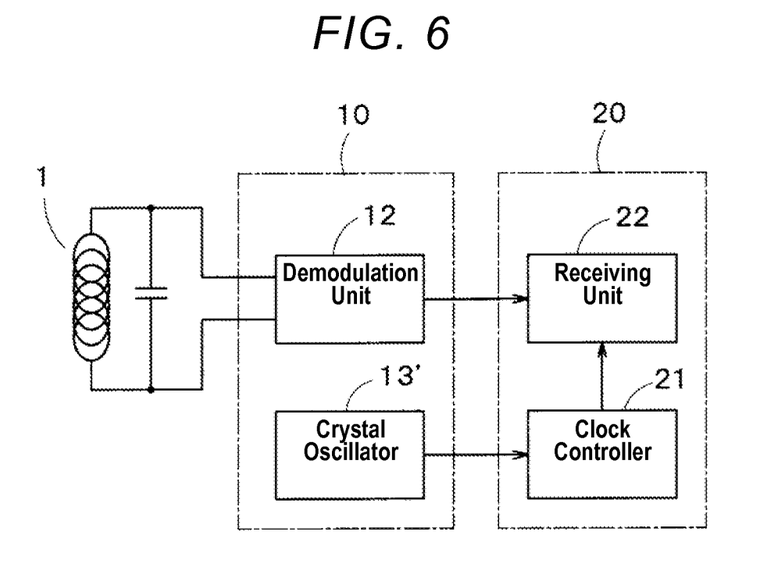
FIG. 6 is a block diagram depicting a schematic configuration of a wireless communication apparatus according to another embodiment.

FIG. 6 is a block diagram depicting a schematic configuration of a wireless communication apparatus according to another embodiment. FIG. 6 depicts the wireless communication apparatus used in a reader and writer of a wireless IC card. FIG. 6 is different from FIG. 4 in that the analog circuit 10 has a crystal oscillator 13' instead of the clock extraction unit 13. The crystal oscillator 13' generates a clock signal of 13.56 MHz, and the clock signal is supplied to the receiving unit 22.

Further, in the wireless communication apparatus of FIG. 6, the demodulation unit 12 operates on power from a power supply provided separately, i.e., without receiving power from other wireless communication apparatuses. Therefore, the rectifier 11 is not provided inside the wireless communication apparatus. Other parts are almost the same as the wireless communication apparatus of FIG. 4.

The wireless communication apparatus is not limited to FIGS. 4 and 6, and various configurations are possible.

For example, the rectifier 11 may be provided in the wireless communication apparatus of FIG. 6. Then, the demodulation unit 12 may operate by a voltage which is output from the rectifier 11, or may operate at a voltage supplied from other parts. Further, the voltage which is output from the rectifier 11 may be supplied to processing units (not shown) other than the demodulation unit 12.

Otherwise, in the wireless communication apparatus of FIG. 4, the crystal oscillator 13' may be provided instead of the clock extraction unit 13.

In addition, various modifications can be contemplated with respect to the arrangements, the operations and the like of the rectifier 11, the clock extraction unit 13, and the crystal oscillator 13'.

Figure 7:
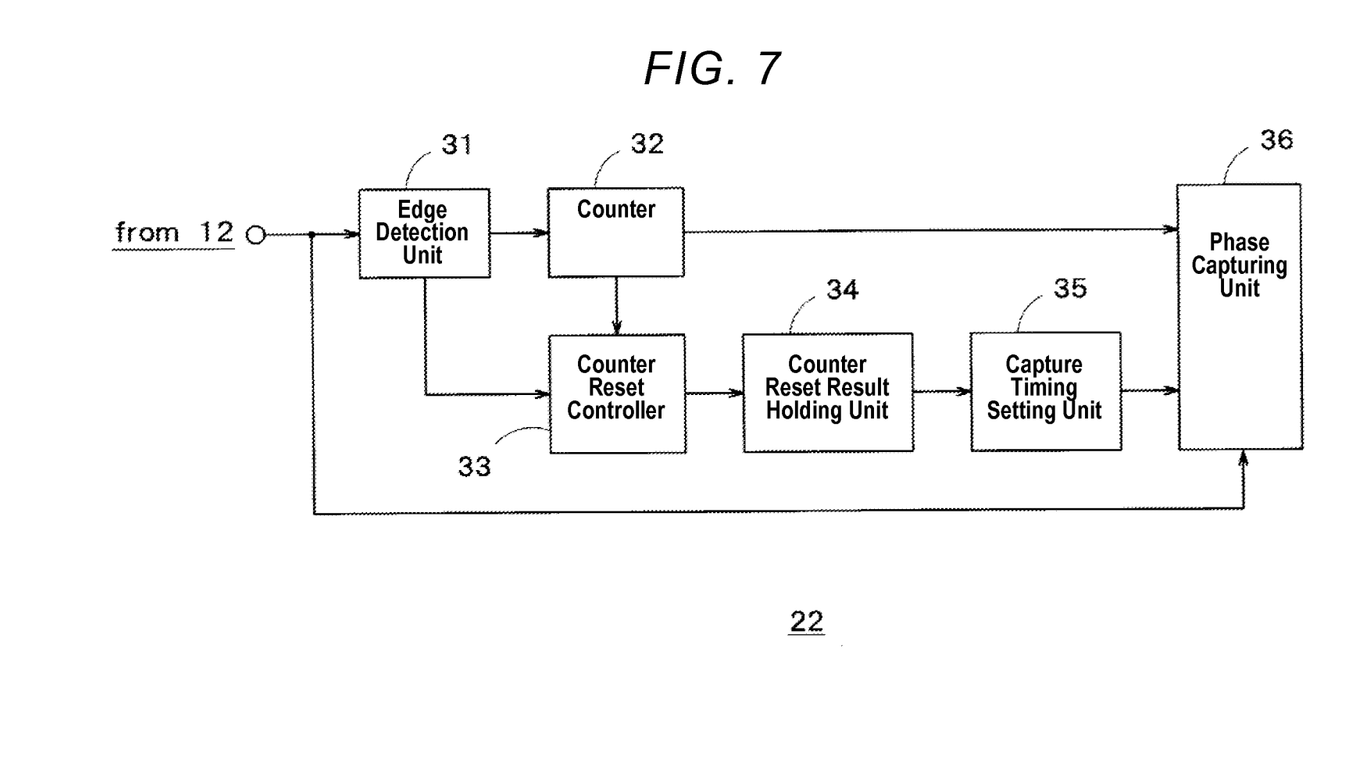
FIG. 7 is a diagram depicting an example of an internal configuration of a receiving unit.

FIG. 7 is a diagram showing an example of an internal configuration of the receiving unit 22 in the wireless communication apparatuses shown in FIGS. 4 and 6. The receiving unit 22 includes an edge detection unit 31, a counter 32, a counter reset controller 33, a counter reset result holding unit 34, a capture timing setting unit 35, and a phase capturing unit 36.

The edge detection unit 31 detects the rising edge of the digital signal (that is, a transition from the phase "0" to the phase "1") and the falling edge (that is, a transition from the phase "1" to the phase "0").

The counter 32 sequentially updates the count value from the initial value (0 in the examples of FIGS. 2 and 3) to the maximum value (7 in the examples of FIGS. 2 and 3) at a frequency higher (eight times the frequency in the examples of FIGS. 2 and 3) than the frequency of the digital signal. Then, the counter 32 resets the count value to the initial value in synchronism with the edge of the digital signal detected by the edge detection unit 31. Further, if the count value reaches the maximum value, the counter 32 resets the count value to the initial value due to the overflow.

The counter reset controller 33 determines the reset timing of the count value. More specifically, the counter reset controller 33 gets the information that an overflow occurs in the counter, or that the edge detection unit 31 detects the edge of the digital signal.

The counter reset result holding unit 34 holds the reset timing of the count value.

The capture timing setting unit 35 sets the phase capture value. The phase capture value is usually set to a reference value (3 in FIGS. 2 and 3) which is in an approximately intermediate value between an initial value and a maximum value of the count value. Then, when the period of the wireless signal is changed, the capture timing setting unit 35 sets the phase capture value based on the reset timing of the count value in the past such that the phase of a digital signal is captured only once during each period.

When the count value reaches the phase capture value, the phase capturing unit 36 captures the phase of the digital signal. Since the phase capture value is set as described above, the phase capturing unit 36 captures the phase of the digital signal only once during each period of the wireless signal.

Hereinafter, a specific setting example of the phase capture value of the capture timing setting unit 35 will be described.

For example, if the reset by edge occurs, the capture timing setting unit 35 may change the phase capture value to a value (that is, a value close to the initial value) earlier than the reference value. For example, as described in FIG. 2, if the reset by edge occurs at time t1', the capture timing setting unit 35 sets the phase capture value to 1 earlier than the reference value 3. Thus, the capture timing is earlier than normal.

Further, if the reset by overflow occurs successively a predetermined number of times, the capture timing setting unit 35 may change the phase capture value to a value later (that is, a value close to the maximum value) than the reference value. It is because it is considered that the period of the current phase is long.

For example, if the encoding scheme of the wireless signal is Manchester encoding, the value 0 and the value 1 cannot successively occur three times (three periods) or more.

Accordingly, the counter should not overflow more than two times. However in FIG. 2, the reset by overflow occurs successively two times or more, within a duration corresponding to two periods. So, the counter runs successively, and runs in the 3rd period. Therefore, the capture timing setting unit 35 sets the phase capture value to 6 later than the reference value 3. Thus, the capture timing is later than normal.

Further, if the reset by edge occurs before the count value reaches the predetermined value (for example, the maximum value), as time t42' in FIG. 3, the capture timing setting unit 35 may change the phase capture value, because it is considered that the period of the current phase is short and the period of the subsequent phase is long.

In other words, immediately after the reset by edge occurs at time t42', the capture timing setting unit 35, as described above, changes the phase capture value to a value earlier than the reference value. Thus, the phase is captured at time t62. Subsequently, the capture timing setting unit 35 changes the phase capture value to a value later than the reference value. Thus, the phase is captured at time t53 in FIG. 3.

The operation of such a capture timing setting unit 35 can be realized, for example, by the capture timing setting unit 35 including a table inside. For example, when the counter reset by edge or overflow occurs, the phase capture value is set in the table. Further, if one data value is represented by two bits as Manchester encoding, information regarding the duty ratios of the first half and the second half may be stored. Thus, even when the duty ratios of the phase "0" and the phase "1" are not necessarily 50%, respectively, the phase capture value can be correctly set. A modulation scheme and an encoding scheme of the wireless signal to be received are stored as technology information, and the phase capture value may be set according to this technology information.

In this manner, in the present embodiment, the phase capture value is set dynamically in response to the reset timing of the count value. Therefore, the phase can be captured only once during each period of the wireless signal, and as a result, the phase of the wireless signal can be captured accurately.

In addition, in the present embodiment, an example is described in which at the reset of edge or overflow, the count value is reset to the initial value 0, and the phase capture value is changed in response to the reset timing. However, the phase capture value may be changed substantially by the phase capture value being regarded as a fixed value and the count value being reset to other values (not the initial value 0) in response to the reset timing. Further, in response to the reset timing, the count value may be reset to other values and the phase capture value may be changed as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus configured to determine data values represented in phases of a wireless signal, comprising:
   a counter that is configured to update a count value at a frequency higher than a frequency of the wireless signal, and reset the count value to an initial value when a phase of the wireless signal changes and when the count value exceeds a maximum value prior to a phase change in the wireless signal;
   a capture timing setting unit that is configured to set a phase capture value in response to a resetting of the count value; and
   a phase capturing unit that is configured to capture the phase of the wireless signal, when the count value reaches the phase capture value.

2. The apparatus according to claim 1, wherein even when a period of the wireless signal changes, the capture timing setting unit sets the phase capture value so that the phase of the wireless signal is captured only once during each period of the wireless signal.

3. The apparatus according to claim 1, wherein when the count value is reset in synchronism with a change in the phase of the wireless signal, the capture setting unit changes the phase capture value from a predetermined reference value.

4. The apparatus according to claim 3, wherein when the count value is reset in synchronism with the change in the phase of the wireless signal, the capture timing setting unit sets the phase capture value to a value less than the predetermined reference value.

5. The apparatus according to claim 1, wherein when the count value is reset twice in succession as a result of the count value exceeding the maximum value, the capture setting unit changes the phase capture value from a predetermined reference value.

6. The apparatus according to claim 5, wherein when the count value is reset twice in succession as a result of the count value exceeding the maximum value, the capture timing setting unit sets the phase capture value to a value greater than the predetermined reference value.

7. The apparatus according to claim 1, wherein when the count value is reset in synchronism with an edge occurring before the count value reaches a predetermined value, the capture timing setting unit changes the phase capture value to a value different from a predetermined reference value.

8. The apparatus according to claim 7, wherein the counter sequentially updates the count value from the initial value to the maximum value, and the predetermined reference value is a substantially intermediate value between the initial value and the maximum value.

9. A method of determining data values represented in phases of a wireless signal, the method comprising:
   updating a count value in a counter that increments at a frequency higher than a frequency of the wireless signal;
   resetting the count value in the counter to an initial value when the wireless signal has a phase change and when the count value in the counter exceeds a maximum value prior to a phase change in the wireless signal; and
   setting one of the count values as a phase capture value during which the phase of the wireless signal is sampled to determine a data value,
   wherein the phase capture value is set to be less than a predetermined reference value when the resetting occurs in response to a phase change.

10. The method according to claim 9, wherein the phase capture value is set to be greater than the predetermined reference value when the resetting occurs twice in succession in response to the count value exceeding the maximum value.

11. The method according to claim 10, wherein the predetermined reference value is a count value between the initial value and the maximum value.

12. The method according to claim 9, wherein the counter updating the count value occurs at a frequency that is eight times the frequency of the wireless signal.

13. The method according to claim 12, wherein the predetermined reference value is a count value of three.

14. A wireless communication apparatus comprising:
a counter configured to count at a frequency higher than the frequency of a wireless signal, the counter being initialized upon the occurrence of a phase change in the wireless signal and upon a count value of the counter exceeding a maximum value prior to a phase change in the wireless signal;
a capture timing setting unit configured to determine a phase capture value in the counter for capturing a phase of the wireless signal based on the counter value when a phase change in the wireless signal is detected; and
a phase capturing unit configured to capture the phase of the wireless signal, when the count value reaches the phase capture value.

15. The wireless communication apparatus according to claim 14, wherein the capture timing setting unit is configured to set the phase capture value so that the phase of the wireless signal is captured only once during one period of the wireless signal.

16. The wireless communication apparatus according to claim 14, further comprising a counter reset controller configured to reset the counter upon the occurrence of the count value exceeding the maximum value or the phase change in the wireless signal.

17. The wireless communication apparatus according to claim 14, further comprising an edge detection unit configured to detect the phase change in the wireless signal.

18. The wireless communication apparatus according to claim 14, wherein the capture timing setting unit sets the phase capture value to a value less than a predetermined reference value when the phase change in the wireless signal is detected prior to the count value exceeding the maximum value.

19. The wireless communication apparatus according to claim 14, wherein the capture timing setting unit sets the phase capture value to a value greater than a predetermined reference value when the count value exceeds the maximum value twice in succession.

20. The wireless communication apparatus according to claim 14, wherein the capture timing setting unit maintains the phase capture value to a predetermined reference value when the phase change in the wireless signal is detected in synchronism with the count value exceeding the maximum value.

\* \* \* \* \*